US012798101B2

(12) United States Patent
Bolder et al.

(10) Patent No.: US 12,798,101 B2
(45) Date of Patent: Nov. 17, 2026

(54) CHANGE AND ATTENTION-BASED SCENE EXTRACTION

(71) Applicant: Honda Motor Co., Ltd., Tokyo (JP)

(72) Inventors: Bram Bolder, Offenbach (DE); Mathias Franzius, Offenbach (DE); Dirk Ruiken, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 18/621,065

(22) Filed: Mar. 28, 2024

(65) Prior Publication Data

US 2025/0303573 A1 Oct. 2, 2025

(51) Int. Cl.

| | |
|---|---|
| ***B25J 9/16*** | (2006.01) |
| ***B25J 19/02*** | (2006.01) |
| ***G06V 10/25*** | (2022.01) |
| ***G06V 40/18*** | (2022.01) |

(52) U.S. Cl.

CPC ........... *B25J 9/1689* (2013.01); *B25J 19/023* (2013.01); *G06V 10/25* (2022.01); *G06V 40/18* (2022.01)

(58) Field of Classification Search

None

See application file for complete search history.

(56) References Cited

U.S. PATENT DOCUMENTS

| | | | | |
|---|---|---|---|---|
| 9,144,907 | B2 * | 9/2015 | Summer | B25J 9/1692 |
| 10,157,313 | B1 * | 12/2018 | Zhang | A61B 1/046 |
| 11,717,969 | B1 * | 8/2023 | Mourlam | B25J 19/023<br>700/247 |
| 2012/0185090 | A1 * | 7/2012 | Sanchez | B25J 9/161<br>700/253 |
| 2013/0325244 | A1 * | 12/2013 | Wang | G16H 40/67<br>701/26 |
| 2015/0073596 | A1 * | 3/2015 | Fudaba | B25J 3/04<br>901/8 |
| 2015/0217449 | A1 * | 8/2015 | Meier | B25J 9/163<br>901/1 |

(Continued)

FOREIGN PATENT DOCUMENTS

| | | | | |
|---|---|---|---|---|
| WO | WO-2015051815 A1 * | 4/2015 | | B25J 9/1676 |

OTHER PUBLICATIONS

Qi Zhao et al., "Learning saliency-based visual attention: A review", Signal Processing, Jun. 27, 2012, pp. 1401-1407, vol. 93.

(Continued)

*Primary Examiner* — Jonathan L Sample
(74) *Attorney, Agent, or Firm* — JCIPRNET

(57) ABSTRACT

The present disclosure relates to a computer-implemented method for generating a scene representation of an environment. The method includes to obtain a sequence of image of the environment, determine regions of interest in images of the sequence of images, obtain, for each determined region of interest, information on a location in the environment corresponding to the respective region of interest, accumulate the obtained information corresponding to the regions of interest for generating the scene representation of the environment, and output the generated scene representation to at least one of a robot action planner controlling a tele-operated robot or via a display to an operator of the tele-operated robot.

13 Claims, 3 Drawing Sheets

(56) References Cited

U.S. PATENT DOCUMENTS

| | | | | |
|---|---|---|---|---|
| 2016/0055677 | A1* | 2/2016 | Kuffner | G06T 11/00 901/1 |
| 2017/0355080 | A1* | 12/2017 | Podnar | B25J 5/00 |
| 2020/0019237 | A1* | 1/2020 | Jackson | G06F 3/013 |
| 2021/0383115 | A1* | 12/2021 | Alon | A63F 13/77 |
| 2022/0314449 | A1* | 10/2022 | Hosomi | B25J 9/1689 |
| 2022/0404835 | A1* | 12/2022 | Gildert | B25J 9/1605 |
| 2024/0096005 | A1* | 3/2024 | Gildert | B25J 9/1671 |

OTHER PUBLICATIONS

Geng Zhang et al., "Visual Saliency Based Object Tracking", Computer Vision—ACCV 2009, Sep. 23-27, 2009, pp. 1-11.

* cited by examiner

CHANGE AND ATTENTION-BASED SCENE EXTRACTION

TECHNICAL FIELD OF THE DISCLOSURE

The disclosure relates to the general field of tele-robotics, in particular to a representation-generating technique for generating a scene representation of a remote environment in tele-robotics. In particular, the disclosure concerns a computer-implemented-method for generating a scene representation of the environment of the robot, a computer-implemented-method for controlling the robot, and a corresponding tele-robotic system.

TECHNICAL BACKGROUND

Tele-robotics is an area of robotics that is concerned with the control of semi-autonomous devices (robots) from a distance. The robot is located in an environment distant from the operator. Tele-robotics uses television and wireless communication networks or physical connections. Tele-robotic systems require perceiving the environment of the robot by processing sensor data for generating a model or representation of the environment in which the robot operates, and providing the model to both the robot and the operator. For perceiving the environment tele-operating systems currently often use RGBD cameras as sensors.

The RGBD camera is a type of depth camera that provides both color information (color data, “RGB data”) and depth information (depth data, “D data”) at its output in real-time. The depth information is retrievable through a depth image (depth map), which is created by a 3D depth sensor, e.g., a stereo sensor or a time of flight sensor. The RGBD camera may perform a pixel-to-pixel merging of RGB data and depth data in order to provide both in a single image frame.

In tele-robotics, similar to classical robotics, and even in associated technical fields such as driver assistance systems or general computer vision, the camera sensor scans a whole scene in the environment repeatedly with a certain data rate denoted frame rate. Monitoring the environment of the robot with a high frame rate, extracting scene elements of the dynamic scene in the environment, and generating image frames including not only color information but also depth information requires a high amount of computation resources with a high data rate. The slowest element in the image signal processing chain for generating the model on which operation of the robot is based determines an overall system operation rate of the tele-operating system. Hence, the maximum available computation resources determine an overall system operation rate of the tele-operating system.

It is an object of the disclosure to use less computation resources for extracting elements of a scene in the environment of the robot in order to improve system operation of the tele-operating system.

SUMMARY

A computer-implemented method for generating a scene representation of an environment according to a first aspect, a non-transitory computer-readable storage medium embodying a program according to a second aspect, a computer-implemented-method for controlling a robot according to a third aspect, a perception system for generating a model of an environment of according to a fourth aspect, and a tele-robotic system according to a fifth aspect address this and related objects.

The computer-implemented method for generating a scene representation of an environment according to a first aspect of the disclosure comprises obtaining from at least one image sensor a sequence of images of the environment. A region-of-interest detector determines regions of interest in images of the sequence of images. An information extractor obtains information on a location in the environment corresponding to the respective region of interest for each determined region of interest. A scene accumulator accumulates the obtained information corresponding to the regions of interest in order to generate the scene representation of the environment and an interface outputs the generated scene representation to at least one of a robot action planner controlling a tele-operated robot or via a display to an operator of the tele-operated robot.

The non-transitory computer-readable storage medium embodying a program of machine-readable instructions according to the second aspect causes the computing device to perform operations according to the first aspect when executed on a computing device.

The computer-implemented-method for controlling a tele-operating robot according to a third aspect comprises the steps of the computer-implemented method for generating a scene representation of an environment of the first aspect, and the method further comprises controlling the tele-operating robot based on the generated scene representation.

The perception system for generating a scene representation of an environment according the fourth aspect comprises a sensor interface configured to obtain from at least one image sensor a sequence of images of the environment The system further comprises a region-of-interest detector configured to determine regions of interest in images of the sequence of images based on a detected change of image information included in different images of the sequence of images. An information extractor of the system is configured to obtain for each determined region of interest information on a location in the environment corresponding to the respective region of interest. The system also comprises a scene accumulator configured to generate the scene representation of the environment by accumulating the obtained information corresponding to the regions of interest for generating the scene representation of the environment. An interface of the system is configured to output the generated scene representation to at least one of a robot action planner controlling a tele-operated robot or via a display device to an operator of the tele-operated robot.

A tele-operating robotic system according to the fifth aspect comprises the perception system according to the fourth aspect, and the tele-operating robotic system further comprises the tele-operating robot, the at least one image sensor, a robot controller including the robot action planner, and the display device.

BRIEF DESCRIPTION OF THE DRAWINGS

The aspects and exemplary implementation of the present disclosure will be explained in the following description of specific embodiments in relation to the enclosed drawings.

Figure 1:
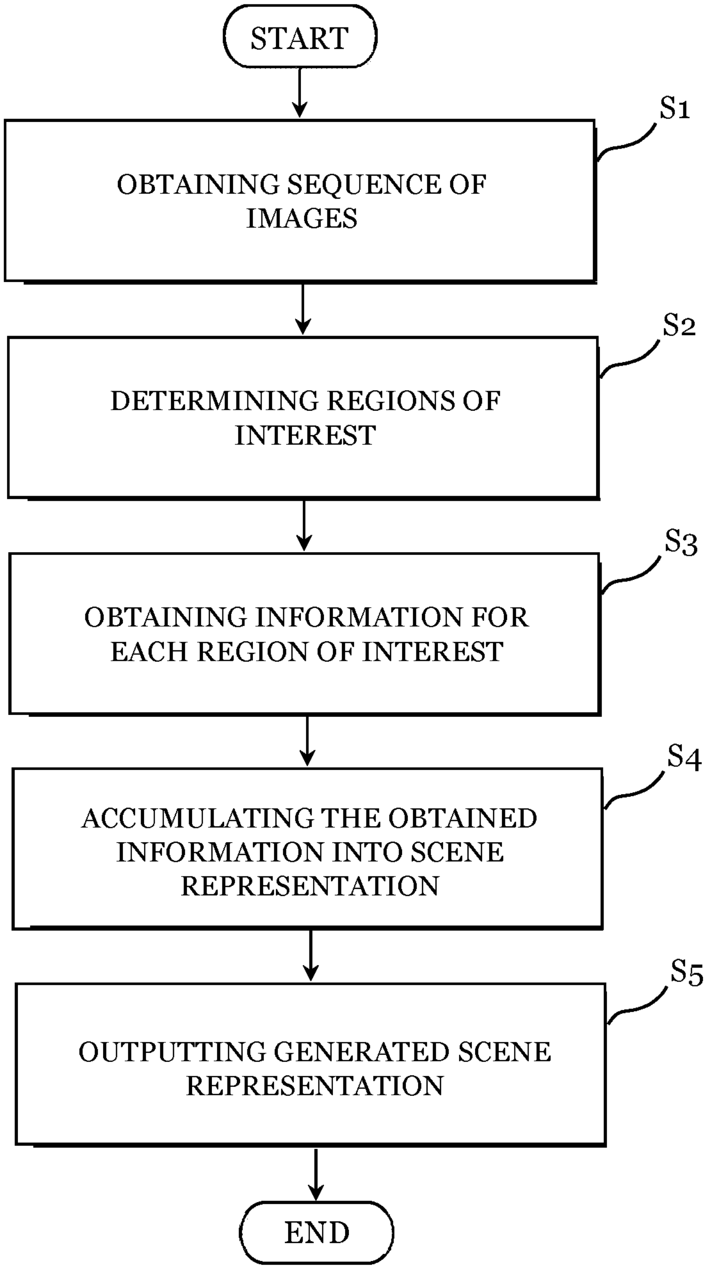
FIG. 1 shows a simplified flow diagram illustrating a computer-implemented method for generating a scene representation of the environment of a robot.

The detailed description of the accompanying figures uses same references numerals for indicating same, similar, or corresponding elements in different instances. The description of figures dispenses with a detailed discussion of same reference numerals in different figures whenever considered possible without adversely affecting comprehensibility. The drawings are not necessarily to scale. Generally, operations of the disclosed processes may be performed in an arbitrary order unless otherwise provided in the claims.

DETAILED DESCRIPTION

A computer-implemented method for generating a scene representation of an environment according to a first aspect, a non-transitory computer-readable storage medium embodying a program according to a second aspect, a computer-implemented-method for controlling a robot according to a third aspect, a perception system for generating a model of an environment of according to a fourth aspect, and a tele-robotic system according to a fifth aspect benefit from a computationally efficient generation of the scene representation of the current environment.

The disclosed methods and systems use a technique for generating the scene representation that requires limited resources for extracting elements of a scene from the sequence of images provided in a sensor signal stream by a camera sensor monitoring the environment. The method may examine those regions in images of the sequence of images in detail that include a determined change in the image data of different images of the sequence of images. In consequence, the method assumes the remainder of the scene constant, or at least to change or move using a very simple model for generating the scene representation. Hence, the method concentrates the resource usage to those portions of the perceived environment, that include changes between images (image frames) in the acquired image signal. Due to adapting usage of computation resources, the method operates either with smaller resources or with a higher update rate for the generated scene representation.

If for example, a scene in the environment includes only minor changes over time the method avoids determining repeatedly for each image frame for a certain number of image pixels to represent a particular object in the environment that has a certain pose. In particular, an identity of an object does not change with a high rate if at all until, e.g., the robot modifies the object. Poses of objects change also change neither randomly nor with a high rate of change. Instead, poses tend to change gradually according to simple movement models. The method benefits from these inherent characteristics of the environment and avoids repeated calculations for generating the scene representation by focusing the computations onto the determined regions of interest.

Even more, the method provides a basic framework for using specific computationally expensive algorithm that provide scene information based on obtained the image signal with a high quality for the determined regions of interest. The computationally expensive algorithms may be used for the regions of interest based on a received instruction by the operator or further determination criteria. The method provides an advantageous technique that couples the perception of the world into a scene representation (model) of the environment that both or one of the tele-operated robot acting semi-autonomously during planning and the operator of the tele-operated robot for instructing the robot may use.

Furthermore, the method provides a framework for improving usage of computation resources by guiding an attention or focus in which regions of interest, e.g., the method that selects where to update the scene representation onto task relevant regions of interest, e.g. including specific entities. In this case, the method further requires learning what the current task of the robot is, and what is relevant for fulfilling the current task. For example, the method includes receiving from the operator an input (instruction) defining the current task. The method may also include evaluating the input to determine relevant objects or scene elements for the current task, e.g. also by referring to a stored database.

The technique for generating the scene representation offers advantages over current approaches in the field of computer vision that use visual saliency and determine regions in images that include entities that distinguish to a predetermined extent from surrounding areas, e.g. belonging to the background. This may include using saliency features for selecting regions that earn attention, e.g. in the form of computational resources, for further processing. Regions in images, which are associated with low saliency features, are disregarded for an update. Contrary thereto, the technique proposed by the computer-implemented method determines the regions of interest based on a change detection mechanism between different image frames in the sequence of images, which is computationally significantly less expensive than the current saliency features. Current approaches are limited to the field of computer vision but do not extract a scene representation from the environment nor even do they assign computation resources for updating a region in space of the environment based on determining regions of interest based on a determined change.

According to an embodiment, the computer-implemented method includes determining, by the region-of-interest detector, the regions of interest based at least on a detected change of image information included in different images of the sequence of images or on a detected direction of gaze of the operator at specific regions in the images or in the environment.

The embodiment using the operator's gaze direction enables to integrate a feedback of the operator into the scene representation process and enables to assign the processing resources for generating the scene representation according to the requirements and preferences of the operator. Even more, the scene representation generation process becomes dynamically adaptable based on the determined operator feedback during operation of a tele-operating system in an intuitive manner.

The computer-implemented method according to an embodiment comprises determining by the region-of-interest detector the regions of interest further based on a received input of the operator that identifies specific regions in the images or in the environment.

The input of the operator may be received via, e.g. a pointing device, preferably via a data glove, or via speech. For example, the operator may instruct the system implementing the method to "focus on the red bottle". This embodiment also integrates a feedback of the operator into the scene representation process and enables to assign the processing resources for generating the scene representation according to the current requirements and preferences of the operator. The scene representation generation process becomes dynamically adaptable based on the determined operator feedback during operation of a tele-operating system.

The computer-implemented method according to an embodiment comprises determining by the region-of-interest detector, the regions of interest further based on an estimated confidence for detected scene elements in the sequence of images.

This embodiment may achieve, by focusing on scene elements detected with only low-confidence estimates, e.g. detected poses contrary to detected objects, to apply more attention and processing resources in order to improve estimates and confidence of the entire generated scene representation.

In a particular example of this embodiment, the computer-implemented method comprises determining by the region-of-interest detector, the regions of interest further based on a detected fluctuation or instability of detected scene elements in the sequence of images.

This embodiment may achieve, by focusing on scene elements whose detection yields detected fluctuations or instabilities, to apply more attention and processing resources in order to improve estimates and confidence of the entire generated scene representation.

The computer-implemented method according to an embodiment comprises generating and outputting to the operator, a visualization of the detected changes in the sequence of images.

This embodiment provides the operator with additional insight into the scene automation process and enables to implement a functionality in the automatically running scene representation generating process, which gives the operator the possibility to identify from changing scene elements those elements that are of particular interest and relevance for the current task. Hence, the operator's knowledge and experience is integrated into the scene representation process based on preselected elements in the scene in the environment, which include changes. The method directs the operator's attention efficiently towards those elements in the scene that include changes and are therefore the most probable elements that are relevant for the future evolvement of the current scene.

The computer-implemented method according to an embodiment comprises, in the step of determining the regions of interest in the images of the sequence of images, discarding determined regions of interest, which include constant variations over a plurality of images.

This embodiment ensures that for specific scene elements, which accumulate much attention over time due to constant variations, e.g., a blinking display or a rotating dial, at the cost of other scene elements the attention and therefore the assigned processing resources in the scene representation generation process are advantageously reduced.

The computer-implemented method according to an embodiment comprises, in the step of determining the regions of interest in the images of the sequence of images, identifying determined regions of interest, which include constant variations over a plurality of images based on detected changes of image information in images of a plurality of images, and generating and outputting, to the operator, a visualization of the identified regions of interest with constant variations.

This embodiment ensures that for specific scene elements, which accumulate much attention over time due to constant variations, e.g., a blinking display or a rotating dial, at the cost of other scene elements, are brought to the attention of the operator. Hence, the operator may determine whether to assign processing resources in the scene representation generation process to these specific elements in the current scene, or to discard the regions corresponding to these scene elements from the list of regions of interest. Hence, the operator is assisted in distributing the computational resources in the scene representation process according to his preferences by a respective input.

The computer-implemented method according to an embodiment comprises, in the step of determining, by the region-of-interest detector, the regions of interest, a first change detector, determining the regions of interest in the images of the sequence of images with a first framerate and a first latency, and a second change detector, determining regions of interest in the images of the sequence of images with a second framerate and a second latency. The first framerate is higher than the second framerate, and the second latency is higher than the first latency, and the first and second change detector operate in parallel.

This embodiment has the advantage of combining a fast and lightweight but potentially lower-quality change detection running at a high framerate and a low-latency slower but higher quality change detection. A list including the regions of interest includes quick results obtained with low processing cost, and is supplemented with high quality results obtained at higher processing cost.

Alternatively, the computer-implemented method may comprise, in the step of determining the regions of interest by the region-of-interest detector, only the first change detector, or only the second frame detector.

FIG. 1 shows a simplified flow chart illustrating a computer-implemented method for generating a scene representation of the environment of a robot 20 (tele-operated robot 20).

In step S1, the method starts with obtaining, from at least one image sensor 21, a sequence of images of the environment of the robot 20.

In an initialization phase, the system 1 extracts an initial description of the scene in the environment from the acquired sequence of images. The initial description corresponds to a coarse description of the scene having a low fidelity.

Subsequently, an attention mechanism then iteratively selects regions in the images representing the input space for further investigation. The attention mechanism may run in a generally known manner. The attention mechanism may select the regions based on, e.g., a detection of visual features in the images, in particular based on a saliency of the visual features.

Alternatively or additionally, the attention mechanism may select the regions based on, e.g., a task relevance of the regions.

Alternatively or additionally, the attention mechanism may select the regions based on an evaluation of the direction of a gaze of the human operator, that defines specific locations and regions in the images. The system may include the known capability of gaze tracking to implement the feature of selecting regions based on gaze. Alternatively or additionally, the attention mechanism may select the regions based on an evaluation, which regions in the images were attended previously by the system.

The system provides an initial scene description of a low fidelity at every step in time, independent from whether or not an attention determining process or a feature extraction process from the images has actually converged.

In step S2, the region-of-interest detector 3 determines regions of interest in images of the sequence of images based on a detected change of image information included in different images of the sequence of images.

For determining regions of interest, the system may monitor the whole input space for salient changes by evaluating the different images in the sequence of images. The system may determine regions of interest in images of the sequence of images based on changes resulting from new objects appearing at a border of images representing the input space. Alternatively, the system may determine regions of interest in images of the sequence of images based on changes resulting from occluding scene elements or objects are removed. Hence, in step S2, the region-of-interest detector 3 of the system 1 determines regions of interest representing detected attention candidates.

In step S2, the system 1 may also use heuristics in order to support a modeling the different scene elements. For example, a heuristic may base on the assumption that objects in the scene do not change their identity over time. A further heuristic may base on the assumption that objects tend not to move without reason. Yet a further heuristic may base on the assumption that objects maintain their size, in order to give some examples for such heuristics. Applying these heuristics enables to determine regions of interest by applying a processes requiring low computational complexity. Contrary thereto, the classic known detection-based scene extraction requires iteratively re-identifying a region in the image representing the search space as a particular object, e.g. an apple, for each of multiple image frames per second.

An information extractor obtains in step S3 for each determined region of interest that was determined in step S2, information on a location in the environment corresponding to the respective region of interest.

In step S4, a scene accumulator accumulates the obtained information corresponding to the regions of interest in order to generate the scene representation of the environment.

In step S5, an interface outputs the generated scene representation to at least one of a robot action planner 7 controlling a tele-operated robot 20 or via a display 6 to an operator of the tele-operated robot 20.

Figure 2:
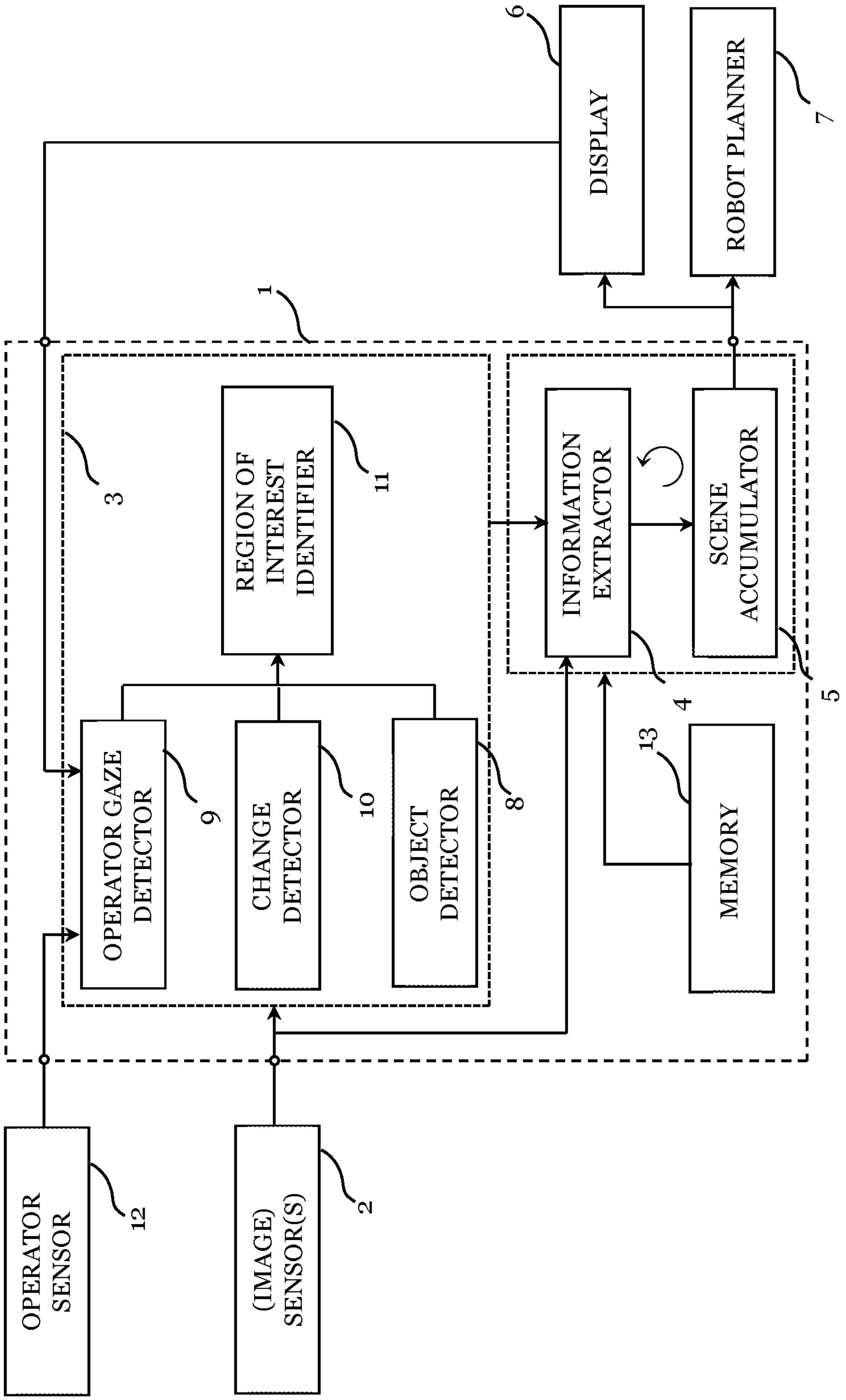
FIG. 2 shows block diagram illustrating a system for generating a scene representation of the environment of a robot.

FIG. 2 shows block diagram illustrating a system 1 for generating a scene representation of the environment of a tele-operated robot 20. The depicted system 1 illustrates a specific embodiment of the technique for generating a scene representation of the environment of the robot 20.

The depicted system 1 focuses on the specific steps for generating the scene representation of the environment of a tele-operated robot 20, and uses multiple, shown in FIG. 2 are actually three attention cues. In a first cue, an object detector 8 of the region-of-interest detector 3 generates simple candidate regions-of-interest. At the center of the region-of-interest detector 3 in a second cue, a change detector 10 determines regions in different images of the sequence of images that have changed to some extent. A third cue is the operator gaze detector 9 of the region-of-interest detector 3, which determines the direction of gaze using an example of the generally known gaze detecting device for determining regions of interest in the images. Combining the three cues implemented in the object detector 8, the operator gaze detector 9, and the change detector 10 provide a list of regions of interest that are then used one by one to obtain more detailed information for each region of interest in the subsequent information extractor 4. The detailed information, e.g., all detected objects are accumulated into the scene representation in the scene accumulator 5. While there are unprocessed regions of interest and computation resources, this process is repeated on the same input or updated images. This particular processing sequence using three specific cues represents one exemplary implementation of the method for generating a scene representation of the environment of a tele-operated robot 20, which will be discussed with more detail thereafter. For example, different implementations may use other cues in combination with the change detector 10 in the region-of-interest detector 3. Preferably, the region-of-interest detector 3 is realized by a plurality of software modules executed on a processor or in a distributed manner on a plurality of processors.

The system 1 includes a sensor interface that obtains a sensor signal from at least one image sensor 2. The at least one image sensor 2 may include a camera sensor, e.g., a RGBD camera. The at least one image sensor 2 monitors the environment of the robot 20.

The sensor signal includes an image data stream comprising a sequence of images (image frames, frames) obtained with a frame rate. Each image of the sequence of images comprises a plurality of pixels. The data stream is provided to the processor on which the software modules are executed.

The sensor interface may obtain an operator sensor signal from a camera 12 monitoring the operator of the robot 20.

The interfaces of the system 1 shown in FIG. 2 further include a display interface that obtains a display information signal that comprises information on the currently display generated based on the generated scene representation and presented to the operator via the display 6.

The system 1 for generating the scene representation of the environment of a tele-operated robot 20 includes a specific embodiment of the region-of-interest detector 3 that includes a change detector 10 and optional object detector 8 and gaze detector 9. The region-of-interest detector 3 determines regions of interest in the images of the sequence of images based on a detected change of image information included in different images of the sequence of images. In particular, the change detector 10 may be implemented as a difference detector that determines differences between corresponding pixels in different images of the sequence of images in order to detect changes in the different images. The different images may be sequential images of the sequence of images. Alternatively, the different images are images of the sequence of images that are captured by the at least one sensor 2 at times separated by a predetermined time difference or having a predetermined number of images in the sequence of images in between. The change detector 10 may compare the determined difference between the images with a predetermined threshold and discard differences, which are smaller than the predetermined threshold for further processing in order to reduce noise. The change detector 10 provides pixels that change between the different images to the region-of-interest identifier 11 of the region-of-interest detector 3. The region-of-interest identifier 11 uses a clustering algorithm for determining regions-of-interest based on the pixels for which the changed detector 10 determined a change that exceeds the predetermined threshold.

The at least one image sensor 2 may be a 3D sensor that provides 3D information in the sensor signal, e.g. a RGBD camera sensor Hence, the region-of-interest detector 3, and in particular region-of-interest identifier 11, is not limited to identifying 2D regions-of-interest in the obtained sensor signal on the environment. The region-of-interest detector 3, and in particular region-of-interest identifier 11, may identify 3D regions-of-interest in the obtained sensor signal on the environment.

The specific implementation of the region-of-interest detector 3 shown in FIG. 2 comprises an object detector 8 in addition to the change detector 10. The object detector 10 may use a known object detector algorithm provided it is computationally inexpensive. The object detector 10 for detecting objects in images included in the sequence of images, is not used for recognizing specific objects, or any feature extraction from images of the sequence of images.

The specific implementation of the region-of-interest detector 3 shown in FIG. 2 comprises an operator gaze detector 9 in addition to the change detector 10. The operator gaze detector 9 uses an algorithm for determining regions in the current scene in the environment to which the operator directs his gaze. The operator gaze detector 9 may use a known algorithm for determining the gaze direction of the operator, e.g. based on the sensor signal from the operator sensor 12 and the display generated and output based on the scene representation on the display 6 or the sensor signal obtained from the at least one image sensor 2 monitoring the environment.

The operator gaze detector 9 and the region of interest identifier 11 may determine the region of interest based on the determined gaze direction as a 2D region that is then mapped to a 3D region with a predetermined volume.

The region-of-interest detector 3 generates a list including a plurality of regions of interest. A particular implementation of the region-of-interest detector 3 may suppress similar inputs for images for a predetermined time, thereby reducing and optimizing use of computation resources of the subsequent information extractor 4. On the one hand, the detectors 8, 9, 10 using different detection cues of the region-of-interest detector 3 each may provide similar regions-of-interest per input cue over time. For example, the object detector 8 probably detects the same regions of interest for every new image. On the other hand, detectors 8, 9, 10 using different detection cues of the region-of-interest detector 3 may detect the same regions-of-interest. For example, the operator gaze detector 9 may determine the operator to gaze at the same region where the change detector 10 determines a change, hence some movement to occur.

The information extractor 4 then obtains for each determined region of interest in the generated list of list of regions of interest, information on a location in the environment that corresponds to the respective region of interest. As long as there are regions-of-interest in the list, the information extractor 4 obtains the information about the location and feeds this obtained information to the scene accumulator 5, which generates the scene representation by accumulating the obtained information from the information extractor 4. The information extractor 4 may obtain the information from different sources. This is acceptable since the information extractor 4 it is decoupled from the image and determination of region-of-interest processing pipeline.

The information extractor 4 may, e.g. include at least one of an object recognition framework followed by an object pose estimation, an obstacle mesh extractor, and a tracker that searches for updates to previous instances of detected scene elements in the environment. For the latter, it will need a feedback on the previous scene state.

The information extractor 4 including the tracker that searches for updates to previous instances of detected scene elements in the environment benefits from an acquired feedback on a previous state of the scene representation.

In particular the information extractor 4 and the scene accumulator may use a memory 13 of the system 1, e.g. for storing previous states of the scene representation.

The system 1 includes an output interface for outputting the generated scene representation to at least one of a robot action planner 7 controlling the tele-operated robot 20 or via the 6 display to the operator of the tele-operated robot 20.

Figure 3:
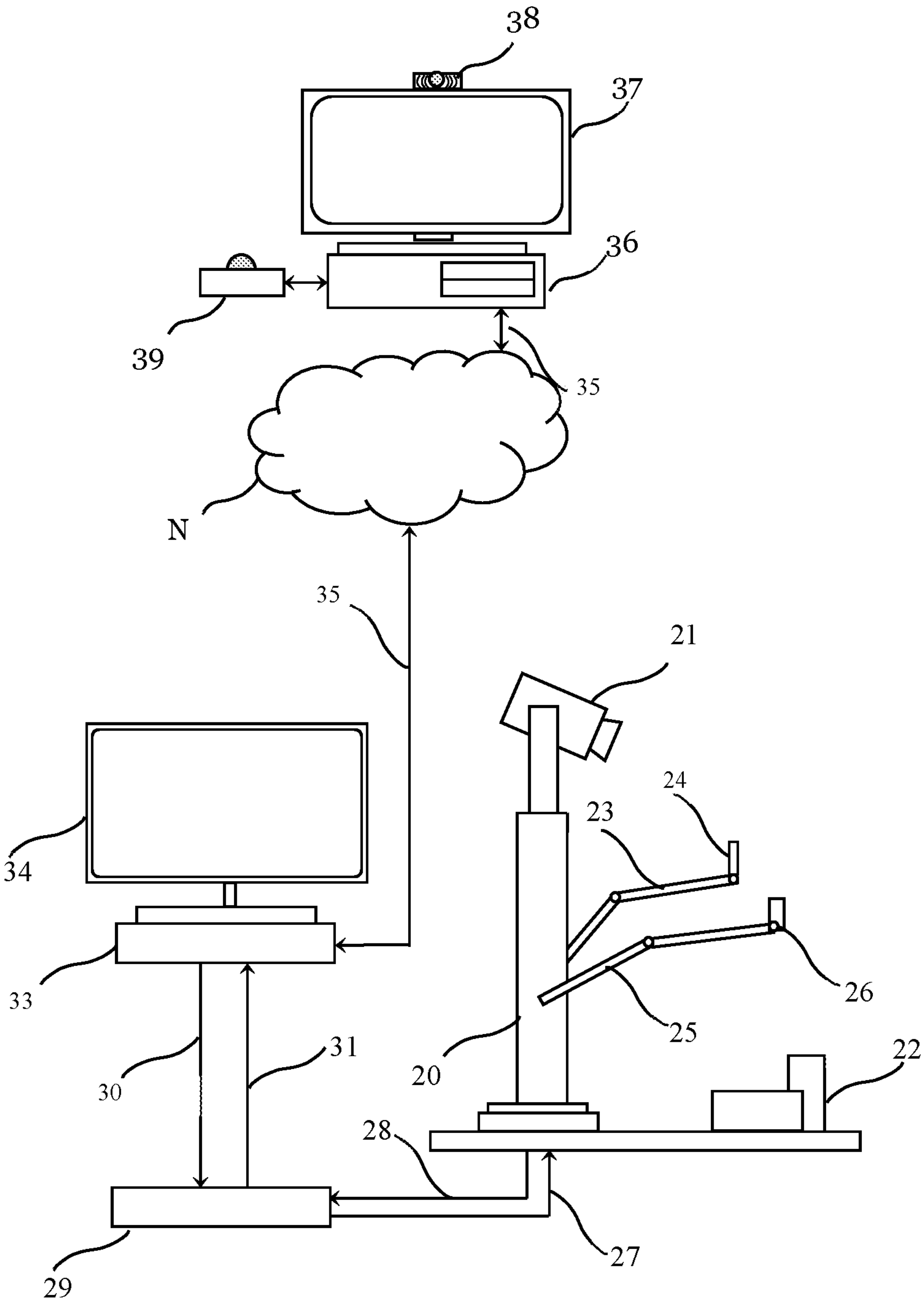
FIG. 3 shows a schematic of an exemplary hardware structure of a tele-robotic system.

FIG. 3 shows a schematic of an exemplary hardware structure of a tele-operating robotic system. The specific application scenario of the method for operating an assistance system 1 including a tele-operated robot 20 (semi-autonomous device 20, agent 20) in a specific environment.

The robot 20 is an artifact whose configuration of sensors 21, actuators 23, 25, and integrated control system provides a significant level of flexible, independent, and autonomous skill. The term autonomous or semi-autonomous denotes the extent to which the robot 20 is able to sense the environment using its sensors 21, e.g. a camera sensor monitoring the environment. The tele-operating system uses the method for generating a scene representation based on the perceived environment. The tele-operating robotic system is a capable to plan actions based on the scene representation and to act by performing sequences of actions or skills planned based on the scene representation of the monitored environment with the intent of reaching a target without or with limited external control. An operator user may provide at least one of the target and more specific instructions for specific actions to the robot 20 via a human-machine interface.

The tele-operating robotic system of FIG. 3 comprises the robot 20, illustrated as a stationary bi-manual robot, with two effectors 23, 24, and a camera-based sensor 21. The tele-operating robotic system comprises data processing equipment, e.g. at least one computer 33, which is configured to run a planning algorithm and a motion generating algorithm for planning actions and sequences of actions for performance by the robot 20. In particular, a program implementing a planning process implementing the action planner in order to devise a plan to address a task by controlling at least one effector trajectory of the effectors 23, 24 may run on the computer 33.

The computer 33 may include at least one processor, at least one memory, for example comprising non-volatile and volatile memories for storing program instructions, and program data generated during execution of the method. The tele-operating robotic system acquires a task description for the predefined task, for example, via a human-machine interface for obtaining instructions from an operator to the tele-operating robotic system.

The sensor device 21 determines a current location of an object 22 in the environment. The sensor 21 generates a sensor signal 28 and provides the sensor signal 28 to the computer 34. The sensor signal 21 enable the tele-operating robotic system to generate a scene representation, e.g. including determined states of the robot 20 and of objects 22 and devices in the environment observed by the sensor 21. The observed states and the sensor signal 28 also enable the robotic assistance system 1 25 to monitor a task progress while performing a sequence of skills.

The computer 33 runs in the planning module a planning algorithm that enables the tele-operating robotic system to search for plan to solve a planning problem provided to the planning module.

The tele-operating robotic system may include a robot controller 29 of the tele-operating robotic system for controlling actuators of the effectors 23, 25 of the robot 20 using an actuator control signal 27 generated based on the control signal 30 provided by the computer 33 of the tele-operating robotic system. The robot 20 may generate a status signal and output the status signal 28 to the robot controller 20. The robot controller 29 may provide the information contained in the status signal along with further status information on the robot 20 to the computer 33 in a status signal 31.

The computer 33 may include the human-machine interface comprising input/output means, for example, output means such as a monitor 34 for displaying image information to the operator and input means to acquire input instructions from the operator. The computer 33 may in particular run software implementing the human-machine user interface. The human-machine interface may include for example a graphic user interface GUI for interacting with the operator. The computer 33 may include the human-machine interface configured to display the image information to the operator that guides the operator in achieving a target state of the robot 20 and the object 22. The human-machine interface may also include a virtual reality (VR) device configured to visualize the environment existing in the real world to the operator.

Additionally or alternatively, the human-machine interface may include an augmented reality (AR) device configured to present information to the operator that guides the operator in achieving the target state by displaying an overlay image to the task environment existing in the real world to the user. In this embodiment, the human machine interface may run on a mobile computing device, e.g., a tablet computer equipped with a camera. A display may present the information for guiding the user as a semi-transparent overlay image to an image of the task environment acquired by the camera of the tablet computer.

Alternatively, the human-machine interface may include the virtual reality device configured to visualize a generated virtual environment to the operator.

The structure of the tele-operating robotic system shown FIG. 3 is one example. It is noted, that some or all structural elements of the tele-operating robotic system, e.g. the computer 33, the robot controller 29, and the sensor 21 may be integrated into the robot 20.

The robot 20 is not limited to a stationary robot 20, but may also be implemented as a mobile autonomous device moving around the environment. The robot 20 may implement an assistive household robot. For helping in the kitchen, the autonomous device 2 needs to know about objects, e.g. food, and devices, e.g. kitchen tools, how they can be used, which effects the kitchen tools have when applied to a specific object, for example. For this purpose, a hierarchy of all the entities present in the kitchen as the current environment can be taught beforehand or extracted from other knowledge sources like, e.g. a publicly available database (knowledge base) accessed via a communication network N, or may be taught beforehand as well as being extracted from the other knowledge sources.

The tele-operating robotic system of FIG. 3 is connected via the communication network N with a remote control device. The remote control device enables the operator to view the environment of the robot 20 as perceived based on the sensor signal 28 in the scene representation transmitted via the communication signal 35 to the remote control device 20.

The remote control device may include a remote computer 36, and a display 37. The display 38 displays the scene representation received by the remote control device. The remote control device includes input means 39 that provide the operator with the capability to input instructions to the remote control device and to operate the robot 20 from a distance. The input means 39 may include a pointing device, mouse, trackball, microphone, joystick, data-glove or similar devices common to computers, and the input means may specifically include a combination of such devices.

The remote control device illustrated in FIG. 3 includes a camera 38 arranged to monitor the operator. The image signal provided by the camera 38 in combination with the displayed scene representation on the display 37 enables determining and analyzing a gaze direction of the operator in relation to the scene representation of the environment.

In supported tele-operation of a robot 20, the method and the system 1 require significantly less computation resources for generating the scene representation of the environment. The computation resources can be used instead for increasing the frame rate for updating the scene representation. Thereby, the method and system support a more fluent tele-operation of the robot 20. In case of additionally evaluating the operator's eye gaze, a highly intuitive operation of the tele-operating robot 20 is achieved.

All features described above or features shown in the figures can be combined with each other in any advantageous manner within the scope of the disclosure. The detailed discussion of embodiments presents numerous specific details for providing a thorough understanding of the invention defined in the claims. It is evident that putting the claimed invention into practice is possible without including all the specific details.

In the specification and the claims, the expression "at least one of A and B" may replace the expression "A and/or B" and vice versa due to being used with the same meaning. The expression "A and/or B" means "A, or B, or A and B".

What is claimed is:

1. A computer-implemented method for generating a scene representation of an environment for tele-operation, the method comprising:

obtaining, from at least one image sensor, a sequence of images of the environment;

determining, by a region-of-interest detector, regions of interest in images of the sequence of images based on a detected change of image information included in different images of the sequence of images, wherein the determined regions of interest identify portions of the environment for which processing resources for updating information of the scene representation are allocated;

obtaining, by an information extractor, for each determined region of interest, information on a location in the environment corresponding to the respective region of interest;

accumulating, by a scene accumulator, the obtained information corresponding to the regions of interest to generate the scene representation of the environment, wherein previously generated scene-representation information corresponding to portions of the environment outside the determined regions of interest is maintained while updating the scene representation; and outputting, by an interface, the generated scene representation to at least one of a robot action planner controlling a tele-operated robot or via a display to an operator of the tele-operated robot.

2. The computer-implemented method according to claim 1, wherein, in the step determining, by the region-of-interest detector, the regions of interest further based on a detected direction of gaze of the operator at specific regions in the images or in the environment.

3. The computer-implemented method according to claim 1, wherein the method comprises determining, by the region-of-interest detector, the regions of interest further based on a received input of the operator that identifies specific regions in the images or in the environment.

4. The computer-implemented method according to claim 1, wherein the method comprises determining by the region-of-interest detector, the regions of interest further based on an estimated confidence for detected scene elements in the sequence of images.

5. The computer-implemented method according to claim 1, wherein determining by the region-of-interest detector, the regions of interest further based on a detected fluctuation or instability of detected scene elements in the sequence of images.

6. The computer-implemented method according to claim 1, wherein method comprises generating and outputting to the operator, a visualization of the detected changes in the sequence of images.

7. The computer-implemented method according to claim 1, wherein the method comprises determining the regions of interest in the images of the sequence of images includes discarding determined regions of interest, which include constant variations over a plurality of images based on detected changes of image information in images of a plurality of images.

8. The computer-implemented method according to claim 1, wherein determining the regions of interest in the images of the sequence of images includes identifying determined regions of interest, which include constant variations over a plurality of images based on detected changes of image information in images of a plurality of images, and generating and outputting, to the operator, a visualization of the identified regions of interest with constant variations.

9. The computer-implemented method according to claim 1, wherein, in the step of determining, by the region-of-interest detector, the regions of interest, a first change detector, determines regions of interest in the images of the sequence of images with a first framerate and a first latency, and a second change detector, determines regions of interest in the images of the sequence of images with a second framerate and a second latency, wherein the first framerate is higher than the second framerate, and the second latency is higher than the first latency, and the first and second change detector operate in parallel.

10. A non-transitory computer-readable storage medium embodying a program of machine-readable instructions for generating a scene representation of an environment for tele-operation, wherein the program of machine-readable instructions, when executed on a computing device, causes the computing device to:

obtain, from at least one image sensor, a sequence of images of the environment;

determine, by a region-of-interest detector, regions of interest in images of the sequence of images based on a detected change of image information included in different images of the sequence of images, wherein the determined regions of interest identify portions of the environment for which processing resources for updating information of the scene representation are allocated;

obtain, by an information extractor, for each determined region of interest, information on a location in the environment corresponding to the respective region of interest;

accumulate, by a scene accumulator, the obtained information corresponding to the regions of interest to generate the scene representation of the environment, wherein previously generated scene-representation information corresponding to portions of the environment outside the determined regions of interest is maintained while updating the scene representation; and output, by an interface, the generated scene representation to at least one of a robot action planner controlling a tele-operated robot or via a display to an operator of the tele-operated robot.

11. A computer-implemented method for controlling a tele-operated robot, the method comprising:

obtaining, from at least one image sensor, a sequence of images of an environment;

determining, by a region-of-interest detector, regions of interest in images of the sequence of images based on a detected change of image information included in different images of the sequence of images, wherein the determined regions of interest identify portions of the environment for which processing resources for updating information of a scene representation of the environment are allocated;

obtaining, by an information extractor, for each determined region of interest, information on a location in the environment corresponding to the respective region of interest;

accumulating, by a scene accumulator, the obtained information corresponding to the regions of interest to generate the scene representation of the environment, wherein previously generated scene-representation information corresponding to portions of the environment outside the determined regions of interest is maintained while updating the scene representation;

outputting, by an interface, the generated scene representation to at least one of a robot action planner controlling the tele-operated robot or via a display to an operator of the tele-operated robot; and controlling the tele-operated robot based on the generated scene representation.

12. A perception system for generating a scene representation of an environment for tele-operation, the system comprising:

a sensor interface configured to obtain from at least one image sensor a sequence of images of the environment;

a region-of-interest detector configured to determine regions of interest in images of the sequence of images based on a detected change of image information included in different images of the sequence of images, wherein the determined regions of interest identify portions of the environment for which processing resources for updating information of the scene representation are allocated;

an information extractor configured to obtain for each determined region of interest information on a location in the environment corresponding to the respective region of interest;

a scene accumulator configured to generate the scene representation of the environment by accumulating the obtained information corresponding to the regions of interest, wherein previously generated scene-representation information corresponding to portions of the environment outside the determined regions of interest is maintained while updating the scene representation; and an interface configured to output the generated scene representation to at least one of a robot action planner controlling a tele-operated robot or via a display device to an operator of the tele-operated robot.

13. A tele-operating robotic system comprising:

a perception system comprising:

a sensor interface configured to obtain from at least one image sensor a sequence of images of an environment;

a region-of-interest detector configured to determine regions of interest in images of the sequence of images based on a detected change of image information included in different images of the sequence of images, wherein the determined regions of interest identify portions of the environment for which processing resources for updating information of a scene representation of the environment are allocated;

an information extractor configured to obtain for each determined region of interest information on a location in the environment corresponding to the respective region of interest;

a scene accumulator configured to generate the scene representation of the environment by accumulating the obtained information corresponding to the regions of interest, wherein previously generated scene-representation information corresponding to portions of the environment outside the determined regions of interest is maintained while updating the scene representation; and an interface configured to output the generated scene representation to at least one of a robot action planner controlling a tele-operated robot or via a display device to an operator of the tele-operated robot;

the tele-operated robot;

the at least one image sensor;

a robot controller including the robot action planner; and the display device.

* * * * *